United States Patent
Schlittenbauer et al.

(10) Patent No.: US 9,738,158 B2
(45) Date of Patent: Aug. 22, 2017

(54) MOTOR VEHICLE CONTROL INTERFACE WITH GESTURE RECOGNITION

(71) Applicant: AUDI AG, Ingolstadt (DE)

(72) Inventors: Michael Schlittenbauer, Ingolstadt (DE); Martin Roehder, Ingolstadt (DE); Marcus Kuehne, Beilngries (DE); Lorenz Bohrer, Munich (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/901,436

(22) PCT Filed: Jun. 25, 2014

(86) PCT No.: PCT/EP2014/001726
§ 371 (c)(1),
(2) Date: Dec. 28, 2015

(87) PCT Pub. No.: WO2014/206558
PCT Pub. Date: Dec. 31, 2014

(65) Prior Publication Data
US 2016/0368382 A1 Dec. 22, 2016

(30) Foreign Application Priority Data
Jun. 29, 2013 (DE) .................... 10 2013 010 932

(51) Int. Cl.
*B60K 37/06* (2006.01)
*G06F 3/01* (2006.01)

(52) U.S. Cl.
CPC .............. *B60K 37/06* (2013.01); *G06F 3/017* (2013.01); *B60K 2350/1052* (2013.01)

(58) Field of Classification Search
CPC .. B60K 37/06; B60K 2350/1052; G06F 3/017
See application file for complete search history.

(56) References Cited

U.S. PATENT DOCUMENTS 6,002,808 A * 12/1999 Freeman ................. G06F 3/017
348/171
6,804,396 B2 * 10/2004 Higaki ............... G06K 9/00335
382/181

(Continued)

FOREIGN PATENT DOCUMENTS

CN 1818984 8/2006
DE 10022321 11/2001

(Continued)

OTHER PUBLICATIONS

Chinese Office Action issued on Jul. 25, 2016 in corresponding Chinese Patent Application No. 201480002890.8.

(Continued)

*Primary Examiner* — Sean Conner
*Assistant Examiner* — Pinalben Patel
(74) *Attorney, Agent, or Firm* — Staas & Halsey LLP (57) ABSTRACT

A method for operating a motor vehicle control panel having a camera system and a gesture recognition device. includes filming a person gesticulating using at least one arm in the inside of the vehicle. Description data relating to a position and/or a sequence of movements of the at least one gesticulating arm is determined by the gesture recognition device and is associated with a control gesture. At least one situation parameter, which describes a gesticulation context of the person, is determined by a plausibility device which decides whether the person has performed a possible control gesture or only a gesture which is to be ignored. If it is determined that it is a possible control gesture, a control command is generated for the control gesture.

19 Claims, 1 Drawing Sheet

(56) References Cited

U.S. PATENT DOCUMENTS

| | | | |
|---|---|---|---|
| 7,036,094 B1* | 4/2006 | Cohen | G06K 9/00348 715/863 |
| 7,340,077 B2* | 3/2008 | Gokturk | G06F 3/017 348/208.14 |
| 7,702,130 B2* | 4/2010 | Im | G06F 3/017 382/103 |
| 8,378,970 B2* | 2/2013 | Nishida | G06F 3/017 345/158 |
| 8,515,128 B1* | 8/2013 | Hildreth | G06F 3/017 345/156 |
| 8,681,099 B2 | 3/2014 | Nishida et al. | |
| 8,849,506 B2* | 9/2014 | Suzuki | G06F 3/017 345/173 |
| 8,891,868 B1* | 11/2014 | Ivanchenko | G06F 3/017 382/168 |
| 9,158,381 B2* | 10/2015 | Alaniz | G06F 3/017 |
| 9,239,624 B2* | 1/2016 | Wang | G06F 3/017 |
| 9,423,879 B2* | 8/2016 | Chen | G06F 3/017 |
| 2004/0141634 A1 | 7/2004 | Yamamoto et al. | |
| 2006/0187196 A1 | 8/2006 | Underkoffler et al. | |
| 2008/0181456 A1* | 7/2008 | Aoki | G06F 3/0346 382/103 |
| 2009/0139778 A1 | 6/2009 | Butler et al. | |
| 2009/0180668 A1* | 7/2009 | Jones | G06F 3/017 382/103 |
| 2009/0327977 A1 | 12/2009 | Bachfischer et al. | |
| 2010/0328201 A1* | 12/2010 | Marvit | G06F 1/1613 345/156 |
| 2011/0286676 A1* | 11/2011 | El Dokor | G06F 3/017 382/225 |
| 2012/0207345 A1* | 8/2012 | Tang | G06F 3/017 382/103 |
| 2012/0293404 A1* | 11/2012 | Federico | G06F 3/0304 345/156 |
| 2013/0278501 A1* | 10/2013 | Bulzacki | G06F 3/017 345/157 |
| 2014/0009378 A1* | 1/2014 | Chew | G06F 3/017 345/156 |
| 2014/0079285 A1* | 3/2014 | Yamashita | G06T 7/20 382/103 |
| 2014/0267018 A1* | 9/2014 | Kempinski | G06F 3/017 345/156 |
| 2014/0270352 A1* | 9/2014 | Fujimura | G06K 9/44 382/103 |
| 2014/0359473 A1* | 12/2014 | Tang | G06F 3/0484 715/746 |
| 2015/0015710 A1* | 1/2015 | Tiryaki | B60R 1/00 348/148 |
| 2015/0088336 A1* | 3/2015 | Shin | G06F 3/017 701/1 |

FOREIGN PATENT DOCUMENTS

| | | |
|---|---|---|
| DE | 10233233 | 2/2004 |
| DE | 10349568 | 5/2004 |
| DE | 102006009291 | 9/2007 |
| DE | 102006037156 | 9/2007 |
| DE | 102008048325 | 4/2009 |
| DE | 10 2013 010 932.9 | 6/2013 |
| WO | 2010/119085 | 10/2010 |
| WO | PCT/EP2014/001726 | 6/2014 |

OTHER PUBLICATIONS

WIPO translation of PCT International Preliminary Report on Patentability dated Jan. 7, 2016 in corresponding International Patent Application No. PCT/EP2014/001726.

German Office Action for German Priority Patent Application No. 10 2013 010 932.9, issued Jul. 14, 2014, 3 pages.

German Decision to Grant for German Priority Patent Application No. 10 2013 010 932.9, issued Oct. 24, 2014, 9 pages.

English Language International Search Report for PCT/EP2014/001726, mailed Dec. 4, 2014, 2 pages.

Mithun George Jacob et al., "Hand-gesture-based sterile interface for the operating room using contextual cues for the navigation of radiological images," J Am Med Inform Assoc, published Dec. 18, 2012, downloaded from jamia.bmj.com on Jul. 11, 2014, 22 pages with a 4 page Brief Communication.

* cited by examiner

MOTOR VEHICLE CONTROL INTERFACE WITH GESTURE RECOGNITION

CROSS REFERENCE TO RELATED APPLICATIONS

This application is based on and hereby claims priority to International Application No. PCT/EP2014/001726 filed on Jun. 25, 2014 and German Application No. 10 2013 010 932.9 filed on Jun. 29, 2013, the contents of which are hereby incorporated by reference.

BACKGROUND

One aspect of the invention relates to a motor vehicle user interface, with which a person can operate one or a plurality of devices in a motor vehicle by gesticulating, i.e. an infotainment system and/or an air conditioning system, for example. The person can perform the gestures with at least one arm. A gesture is identified optically, wherein it is filmed by a camera system and is then associated by a recognition device with one of a plurality of predefined operating gestures using a classification.

A user interface of this type is for example known from DE 103 49 568 A1. According thereto, a hand of an operator in a motor vehicle is filmed by a camera system that is disposed in a ceiling of the interior of the vehicle above a central console of the motor vehicle. If a person holds his hand above the central console and adopts a predetermined position with the hand or makes a predetermined hand movement, this is identified by a recognition device coupled to the camera system and a corresponding control command is output to a radio of the motor vehicle for example, so that the person can adjust a playback volume with their operating gesture for example.

It has been shown to be problematic with gesture recognition in a motor vehicle that a person often also holds their hand in the region above the central console for other reasons and gesticulates there with the hand. If for example a driver is conversing with another passenger and while doing so leans his arm on an armrest of the central console, then his hand will also be located in the detection region of the camera system. If he then performs a gesture with the hand that is not defined for the operation of the motor vehicle, for example because he is just explaining something and is gesticulating while doing so, then the gesture, which is actually to be ignored, is also filmed by the camera system and interpreted by the recognition system. It can thus occur that equipment settings can be altered during the conversation without the driver intending this.

A user interface for a motor vehicle is described in DE 10 2006 037 156 A1, with which graphical contents are altered by operating gestures on a touch screen (contact-sensitive display screen) and are adjusted at the finger position in doing so. Thus for example an approaching finger can be detected and interpreted as an impending operating gesture on the touch screen. Accordingly, for example a letter or a menu entry can be shown enlarged so that the operator can then touch this more easily with a fingertip. Thus with this system only the representation on the display screen can inadvertently be altered by a gesture that is actually to be ignored, without a control command being inadvertently generated at a device, however. The control command is only produced in the event of actually touching the touch screen. However, it is a disadvantage with this that in order to touch the correct function on the display screen the driver has to divert his view from the traffic scene in order to be able to locate letters or menu entries.

A user interface of a motor vehicle is known from DE 10 2006 009 291 A1 that comprises a gesture recognition device that processes 3D image data. For this purpose, an upstream camera system comprises a time-of-flight camera. A stereo camera can also be provided for producing the 3D image data.

SUMMARY

An aspect of the invention is to provide robust gesture recognition in a motor vehicle that does not produce control commands in the case in which a person inadvertently gesticulates in a detection region of the gesture recognition system.

The aspect is achieved by a method according to claim 1, a user interface according to claim 14 and a motor vehicle according to claim 15. Advantageous developments of the aspect are revealed by the dependent claims.

The aspect is achieved by dual gesture recognition. The first gesture recognition is based here on the approach known from the related art of filming by a camera system of a person gesticulating with at least one arm in the interior of the motor vehicle and of analyzing the filmed gesture by a recognition device. The recognition device can for example comprise a program module of a central computing device or of an infotainment system of the motor vehicle. By "arm" is meant the limb including the hand, wherein the gesticulation can be limited to a part of an arm, for example the hand or one or more fingers.

The analysis is carried out by determining descriptive data for a position and/or a series of motions of the at least one gesticulating arm based on image data of the camera system, i.e. data that for example describe the position of the hand and the position of the fingers. The descriptive data are then associated with one of a plurality of predefined operating gestures. It is thus determined for example which of the permissible operating gestures is the most similar to the filmed gesture. The association is carried out in the form of a first classification, such as can be achieved for example by a hidden Markov model or a different approach known from the field of automatic recognition.

Because the first recognition extracts corresponding descriptive data unchecked from all image data of a filmed gesture and associates the same with an operating gesture, the false recognitions described can occur. Whether an operating gesture was meant by the operator, or for example was only randomly carried out during the gesticulations as part of a conversation with another person, i.e. was only a communications gesture, is not checked by the first recognition.

A second, simpler recognition initially only decides whether the person actually wanted to perform one of the possible operating gestures or has only performed a gesture that is not defined for operation, i.e. a gesture that is to be ignored. The second recognition device is referred to here as a plausibility verification device of the user interface, because it determines whether it is at all plausible that the operator wanted to perform an operating gesture that is defined for operation. The plausibility verification device can also be a program module of the central computing device or of the infotainment system, for example. The plausibility verification device determines at least one situation parameter that describes a gesticulation context of the person, i.e. the temporal and spatial context, in which the person has performed a gesture.

Such a situation parameter can for example also be derived from the image data and can specify which overall posture the person has adopted. If for example the person is currently bending under a vehicle seat because he has lost something there, and while doing so is supporting himself on the central console with his hand, then the hand may indeed occupy a position such as also corresponds to one of the possible operating gestures. However, it is clear from the position of the elbow and the position of the head that the person has no operating intention and therefore the gesture is to be ignored.

The situation parameter can, however, also be obtained from other data than the image data. For example, it can be checked whether the person is currently in a conversation with another person. This can for example be determined from audio data. If the gesticulating person is currently speaking, then it is highly possible that his gestures are communications gestures that convey what is being said. Such communications gestures should not be interpreted as operating gestures, but should be ignored.

If the plausibility verification device now decides, using the at least one situation parameter, that a gesticulation context exists that suggests a possible operating gesture, then a control command is also actually output to a device to be operated in the motor vehicle depending on the operating gesture that is recognized by the first classification (described above).

In the event of a decision that it is a gesture to be ignored, by contrast the output of the control command is inhibited. The suppression can be carried out in different ways. If the plausibility verification device is disposed upstream of the actual gesture recognition device for example, then the gesture recognition device can be completely deactivated for example. If by contrast the plausibility verification device is active at the same time as the gesture recognition device or is disposed downstream thereof, then the result of the first classification, i.e. the recognition result of the gesture recognition device, can simply be discarded.

The plausibility verification device itself thus does not identify the individually provided operating gestures, but only decides whether a possible operating gesture exists at all or else a gesture that is to be ignored. In other words, the plausibility verification device determines whether an operating context currently exists in which the person actually wanted to convey an operating request to the gesture recognition device by his gesture. The provision of a plausibility verification device thus has the further advantage that the second classification performed by the same, i.e. the decision as to whether a possible operating gesture or a gesture that is to be ignored exists, is only binary and thus very robust. The number of determined situation parameters only has to be associated with one of two possibilities.

The user interface according to an aspect of the invention comprises the components that are necessary for performing the method according to the invention, i.e. a camera system and an analyzer coupled to the camera system that comprises a gesture recognition device and a plausibility verification device in the described manner.

The motor vehicle also associated with an aspect of the invention comprises an embodiment of the user interface according to the invention. For example, the user interface can be provided as a component of an infotainment system of the motor vehicle and can be configured for the operation for example of the devices of the infotainment system, e.g. of a navigation device, of a media playback device (such as for example a CD playback device, a Blu-Ray playback device or a DVD playback device), and of an air conditioning controller. The motor vehicle according to an aspect of the invention is preferably configured as a motor vehicle, in particular as an automobile.

Different configurations therefore arise with the invention from the way in which the plausibility verification device distinguishes between a possible operating gesture on the one hand and a gesture to be ignored on the other hand.

One embodiment provides that the at least one situation parameter of the gesticulation context comprises a respective speed of at least one movable part and/or joint of the at least one arm. Thus if for example the actual gesture recognition device detects a hand of the operator in an individual camera image in a hand position that corresponds to an operating gesture, then the gesture recognition device would generate a control command for a device corresponding to the recognized operating gesture. If, however, it is identified by the plausibility verification device that the hand was moved through the detection region of the camera system at a defined speed during the image acquisition, i.e. for example was pivoted transversely above the central console, then this gesticulation context is an indication that the person was clearly not intending to perform an operating gesture that is defined for the user interface with his hand, but the hand was pivoted through the detection region only arbitrarily. Accordingly, the plausibility verification device only decides that this is an operating gesture if each of the determined speed values of the individual parts and/or joints lies within a respective predefined speed range. In particular, each speed value must be smaller than a predefined maximum speed value.

A further possibility of avoiding a false recognition is that the at least one situation parameter of the gesticulation context comprises a respective acceleration of at least one movable part and/or joint of the at least one gesticulating arm. If for example the operator is initially holding his hand still in the detection region of the camera system, but he then lifts the hand up, for example in order to grip something, then he can again inadvertently adopt a finger position that corresponds to one of the predefined operating gestures. The recognition device would thus again respond with the generation of a control command. If, however, it is identified by the plausibility verification device that the hand was rapidly accelerated during said recognition process, then this is again an indication that the gesture is not to be interpreted as an operating intention. Accordingly, the plausibility verification device only decides that it is an operating gesture if each acceleration recorded for the individual parts and joints lies within a respective predefined range of acceleration values. In particular, each acceleration value must be less than a predefined maximum acceleration value.

The described ranges of speed values and ranges of acceleration values can for example be determined by observing test persons and suitable value intervals can thus be determined from their behavior.

A special situation arises if a movable part and/or joint of the at least one gesticulating arm is moved so rapidly that neither a speed measurement nor an acceleration measurement is possible, since not enough camera images are produced by the movement. According to one embodiment, a variable is recorded as a situation parameter that indicates whether the part or the joint was moved with a jerk. For this purpose, it can for example be determined whether a change of position within a predefined time in two successive camera images of the camera system is greater than a predetermined maximum distance. If this is the case, then the person has clearly moved jerkily at least with his gesticulating arm, and in this case a decision is made on a gesture that is to be ignored.

As has already been described, it is highly improbable that a person that is bending under a vehicle seat is currently wishing to perform an operating gesture. According to one embodiment, this and other situations can be identified by the at least one situation parameter of the gesticulation context having a respective angle of at least one movable part and/or joint relative to at least one other movable part and/or joint. The relative position of individual regions of the at least one gesticulating arm or even of other parts of the body is also checked. For example, it can also be checked whether an elbow has a normal angle of bend to be expected for the operation of a user interface or for example is bent at an acute angle of for example less than 40°. The plausibility verification device will only decide on an operating gesture here if each monitored relative angle lies within a respective predefined range of angle values. Here too suitable ranges of angle values can again be determined by observing test persons in different situations.

Similarly to the case of the observation of a relative angle, a valuable indication of the gesticulation context can also be obtained by using the location of movable parts and/or joints that are not directly participating in the actual operating gesture to be recognized. If for example one of the operating gestures is currently being performed by a hand, if for example a flat hand with spread fingers is recognized in the image data and yet it appears from the situation parameters that the elbow is vertically above the wrist, then the person clearly appears to be supporting himself on his hand, as could be the case for the scene described above if the person is currently bending under a driver's seat. The plausibility verification device accordingly only decides on an operating gesture during the analysis of the locations if each location lies within a respective predefined spatial region. In particular, one or a plurality of standard postures for the operation of the user interface can be specified in this way. In order to check the plausibility of a recognition result, which means in order to prevent a control command from being output unnecessarily as a result of a gesture that is actually to be ignored for lack of an operating intent, it can for example additionally be checked using such a body model whether the driver has adopted a shoulder position that is unusual for operation. For this purpose, parameters of the body model can be checked as to whether their parameter values lie within predefined intervals. The intervals that are useful for the individual parameter values can be determined by observation of test persons when configuring the plausibility verification device.

One embodiment of the method according to an aspect of the invention provides for this purpose that a body model of at least a part of the person is merged into the image data and that whether the person has adopted a body position indicating an operating intention is verified using the body model. Thus, for example, the shoulder position, the orientation of the head, the position of the elbow and/or of the upper arm and a posture of the pelvis on the vehicle seat can be checked. The generation of a body model and automated merging into image data can for example be achieved with the "Kinect" function library of the Microsoft Company.

Merging a body model into image data means in particular that parameters of the body model are set with parameter values such that the body model conforms to the shape and/or posture represented by the image data up to a predefined error level. Such parameters specify a current value of a property for individual elements of the body model. For example, the displacement angle can be specified for a joint or the orientation in space or a motion vector of its current movement can be specified for a rigid part of a body. The parameters of the body model can also be analyzed for plausibility checking of the body position. For at least one parameter of the body model, in this case a check is made of whether its parameter value has a predefined value or lies within a predefined range of values.

According to another embodiment of the method according to an aspect of the invention, for verification of the body position a probability value relating to an operating intention of the person is associated with the respective current parameter value of each parameter for a plurality of parameters of the body model by a statistical model and then an overall probability value for the operating intention is determined based on the probability values of all parameters that have been checked, wherein a decision on a possible operating gesture is made in the event of the existence of the overall probability value. The trigger signal is then produced for this if the overall probability value is greater than a predefined minimum value. Said statistical model for a parameter can comprise a Gaussian model or a Gaussian mixture model for example. An indication can also be provided by means of the statistical model of the probability that the current angle indicates an operating intention for the current parameter value, for example for a bending angle of the elbow and an articulation angle of a wrist. If the individual probability values for a plurality of such parameters are combined, then using the overall probability value it can be identified whether the current posture actually indicates an operating intention with high reliability. The statistical models can be configured or parameterized for example by training phases, in which test persons are observed using the optical sensor of the monitoring device and the configuration parameters of the statistical models are adapted to the training data. In order to also be able to model time processes statistically, i.e. not only a current parameter value but also a series of a plurality of parameter values of each parameter, hidden Markov models can form the basis for modelling the time process.

The displacement history of the at least one gesticulating arm is well suited for the plausibility check. If for example the described conversation situation again exists, during which an operator is performing communications gestures so as to emphasize what is being said but not so as to actually operate the user interface, then the person will be gesticulating energetically over a longer period of time and also outside of the detection region of the gesture recognition device. If the hand is then once again within the detection region and continuing to gesticulate there, then based on the displacement history it can be identified that the person is only performing gestures that are to be ignored in this case. For example, a predetermined minimum stay time can initially be allowed to elapse before the gestures performed in the spatial volume provided for recognition by the gesture recognition device are interpreted as operating gestures. Accordingly, one embodiment of the invention provides that a check as to whether an operating situation exists at all is made by the plausibility verification device from a displacement history determined using the image data and that has occurred prior to a movement process that is taken into account for the classification of the gesture. Only in this case is a decision taken on the existence of an operating gesture by the plausibility verification device. For example, the trajectory of motion of joints or other parts of the at least one gesticulating arm can be monitored using the image data. If the locations of the individual monitored regions of the arm have a large variance because the person is waving their arms, is swinging them at random or otherwise moving them during a conversation for example, then it can be provided for example that a correspondingly greater minimum stay time is provided in the detection region of the gesture recognition device in the event of a larger variance. Only if the minimum stay time is exceeded is a gesture recognized, i.e. a position of the hand or a series of motions of the hand for example, associated with one of the possible operating gestures by the gesture recognition device by the classification. The location can be carried out by using the body model described.

Because of the robustness that can be achieved with the two-stage recognition by the plausibility verification device on the one hand and the gesture recognition device on the other hand, with the user interface according to an aspect of the invention it is even possible to dispense with the typical gesture activation button from the state of the art. The same function as a gesture activation button is implemented by the plausibility verification device by the generation of a control command in response to a gesture only if the corresponding gesticulation context also results from using the at least one situation parameter. In other words, the output of the control command after starting the motor vehicle is thus produced independently of a further operation of a dedicated gesture activation button that triggers an individual respective recognition process. The individual recognition processes are classified by the plausibility verification device.

As already stated, the suppression of the control command by the plausibility verification device can either take place by deactivating the gesture recognition device or by discarding the output of the gesture recognition device. A different advantageous development arises if only a certain control command is specifically suppressed by the plausibility verification device, others being allowed by contrast. If for example a person in the motor vehicle is telephoning and is currently speaking himself or the caller on the other end of the line is currently talking, then it is preferable to exclude the performance of the operating gesture for hanging up, i.e. for interrupting the telephone call, from gesture recognition for said periods of time (active speaker). It is thus advantageously avoided that a call is inadvertently interrupted because a person in the motor vehicle has randomly performed the corresponding gesture when gesticulating while speaking or listening. For this purpose the operating gesture that has to be performed to trigger the control command that is to be suppressed is simply excluded from the first classification.

In order to be able to reliably recognize the gesticulation context using the image data, one advantageous development provides for determining the image data by a stereo camera and/or a PMD camera (PMD—Photonic Mixing Device, also known as a time-of-flight camera). The image data then represents three-dimensional information, for example spatial coordinates of individual surface segments of the at least one gesticulating arm. Thus not only surface and two-dimensional color intensity information, but also depth information is provided, from which relative positions of movable parts and/or joints of the at least one gesticulating arm can be reliably determined.

The image data are preferably determined from a ceiling of the interior of the motor vehicle, i.e. the camera system, at least a camera sensor thereof, is preferably disposed in the roof lining or overhead console. Overhead console means the region in which the rear view mirror of the motor vehicle can also be disposed for example. It is located along the vertical axis of the motor vehicle above the central console or the dashboard. From this perspective, obscuring individual regions of a gesticulating arm above the central console is highly improbable. Gesture recognition and plausibility checking are thus particularly reliable.

BRIEF DESCRIPTION OF THE DRAWINGS

These and other objects and advantages of the present invention will become more apparent and more readily appreciated from the following description of the preferred embodiments, taken in conjunction with the accompanying drawings of which:

A vehicle interior 12 of a motor vehicle 10 is shown in the FIGURE.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
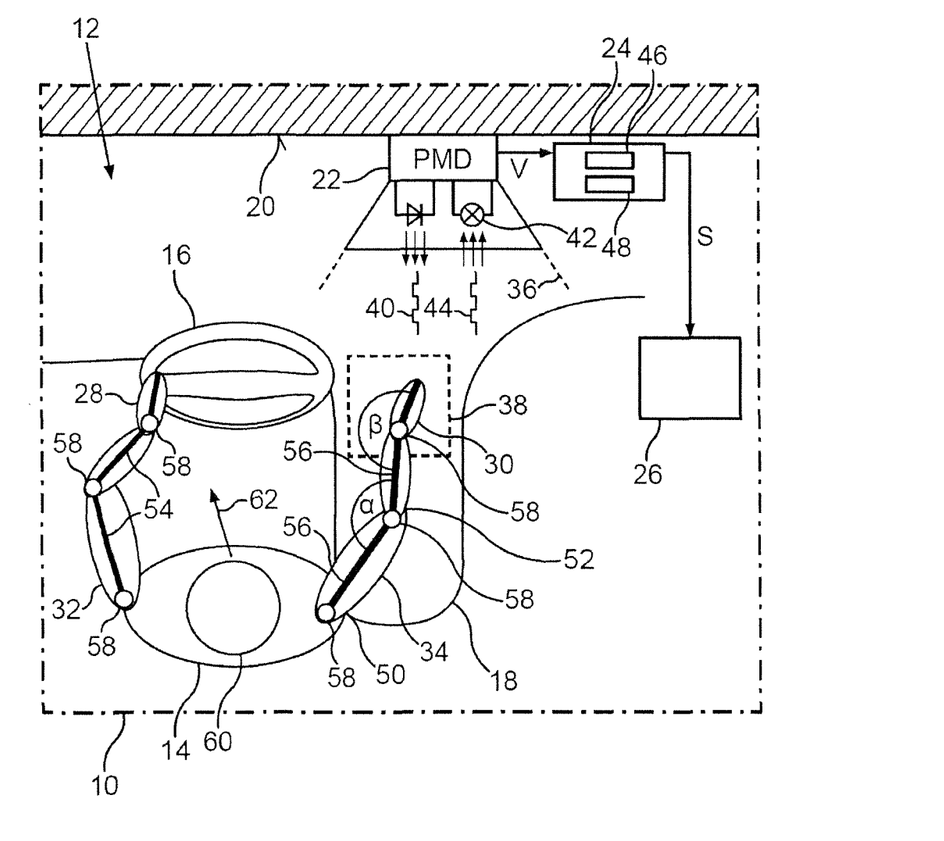

A vehicle interior 12 of a motor vehicle 10 is shown in the FIGURE. The motor vehicle 10 can be an automobile for example. In the interior 12 of the vehicle a driver 14 is sitting on a driver's seat (not shown). Furthermore, the following are shown: a steering wheel 16, a central console 18 and a camera system 22 disposed on a ceiling 20 of the interior 12 of the vehicle. The camera system 22 can be coupled to a computer or computing unit 24. The computing unit 24 can for example be a memory and a hardware processor which is a component of the infotainment system or of a central computing device. Furthermore, the motor vehicle 10 comprises at least one control command receiver or device 26 for providing functions in the motor vehicle 10. The at least one device 26 can for example be an infotainment system, a controller for an air conditioning system and/or a telematics system. In the case of the motor vehicle 10 the at least one device 26 is controlled by the computing unit 24. The control commands S required for this purpose are produced depending on the operating gestures that the driver 14 has to perform for this, for example with one of his hands 28, 30 or with one of the hands 28, 30 together with one of the parts of the arm 32, 34. In order to optically record a gesture performed by the driver 14, an optical detection region 36 of the camera system 22 can for example be directed towards a recognition region 38 in which the driver 14 has to hold those limbs with which he wishes to perform an operating gesture. The recognition region 38 can for example comprise a part of the central console 18.

The camera system 22 can for example be a PMD camera system. Intensity modulated light 40 is radiated into the interior of the vehicle 12 and is reflected there from objects disposed in the detection region 36 back to a camera sensor 42 as reflected light 44. The light 40 can for example be visible light or infrared light. The camera system 22 produces video data V from the reflected light 44 that is transmitted to the computing unit 24.

The computing unit 24 comprises a gesture recognition module 46. The gesture recognition module 46 can be a program module for example. The operating gesture that the driver 14 has performed in the recognition region 38, for example with the hand, is identified by the gesture recognition module 46 using the video data V. If a defined one of the operating gestures is identified, then a corresponding control command S is output by the gesture recognition module 46 to the at least one device 26, which activates a predetermined function on receiving the control command S depending on the control command S, i.e. starts the playback of a piece of music or sets a defined navigation destination, for example.

With the motor vehicle 10 it is ensured that a control command S is not produced merely if the driver 14 randomly performs a movement in the recognition region 38, for example with the hand 30, because he is for example currently stimulated by conversation with another passenger (not shown) of the motor vehicle 10. For this purpose, the computing unit can comprise a plausibility verification module 48. The plausibility verification module 48 can be configured to check, for example using the video data V, whether the driver 14 wished to perform an operating gesture at all or has only performed a communications gesture or a different random hand movement in the recognition region 38 with his hand 30. The plausibility verification module 48 may then decide on the existence of a possible operating gesture, so that a corresponding control command S may be produced by the gesture recognition module 46. If by contrast the plausibility verification module 48 decides on a gesture to be ignored, then the production of control commands S is blocked.

The plausibility verification module 48 enables a distinction to be made between articulation-like gestures and operating gestures. The ability to physically correctly locate the occupant, i.e. the driver 14 or individual parts of a body 28, 30, 32, 34 of the occupant, in particular by a time-of-flight camera, i.e. a PMD camera system 22, allows positions of the individual parts 38, 30, 32, 34 and displacements thereof to be recognized. By evaluation of a certain gesture, which is not only based on the tracking for example of a geometric centroid of the hand 30 in the video data V, but determines numerous other features of the displaced elements 28, 30, 32, 34, a gesticulation context can be concluded that moreover reveals whether the driver 14 currently has an operating intention at all, i.e. intends to produce a defined control command S. The monitored features can for example be the location, the speed, the acceleration, the jerkiness of the movement and the relative angle $\alpha$, $\beta$ of movable parts 28, 30, 32, 34, i.e. of the upper arm in relation to the lower arm or the lower arm relative to the back of the hand, for example. The bending angle of joints can thus also be taken into account.

Using the optical sensor 42, the camera system 22 measures the interior of the vehicle including the occupants located therein, i.e. also including the driver 14. The computing unit 24 assesses the signals by the gesture recognition module 46 and the plausibility verification module 48. The information obtained therefrom is provided as control signals S to the vehicle for a response, i.e. in particular to the device 26. As a result of the positioning of the occupant, such as the driver 14, in the respective vehicle seat being generally limited in terms of the degrees of freedom, in particular an approach 50 by an arm element 34 to the shoulder or even an approach 52 by a lower arm to the upper arm can be very reliably determined in the video data V. Then for example a skeleton model 54, 56 can be modelled in an arm element 32, 34 and thus the location and/or the spatial orientation of the joints 58 for example can be followed and analyzed by the analysis of parameters of the skeleton model 54, and thus a gesture can be plausibility verified by a plausibility verification module 58. Whereas the gesture is to be performed in the recognition region 38 with the hand 30 alone for example, the plausibility verification module 48 can conclude whether the driver 14 has any operating intention by using the spatial context in this case, i.e. the position and orientation of the arm element 34, and even by checking the position of the arm element 32 and for example also the orientation of the head 60 in the case of a corresponding additional observation. If for example a surface normal 62 of a view of the driver 14 is currently pointing to a side mirror (not shown) of the motor vehicle for example, then it is highly improbable that the driver 14 currently wishes to perform an operating gesture with his hand 30 relating to the activation of a mobile telephone for example. If such a gesture is nevertheless identified by the gesture recognition module 46, then the generation of a corresponding control command S can be blocked by the plausibility verification module 48.

Taken as a whole, it is shown with the example how a reduction of incorrect operations by unintentional gestures can be achieved. An increase in the acceptance of gesture operation can thus be expected. In particular, by the elimination of an otherwise necessary gesture activation button, gesture recognition can now be inconspicuously integrated within a user interface of a motor vehicle 10. The elimination of the gesture activation device is made possible by the reliable differentiation between operating gestures and communications gestures, for example.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for operating a user interface in a motor vehicle, wherein the user interface comprises a camera, the method comprising:
    filming a user who is gesticulating with a gesticulating arm, within an interior of the motor vehicle by the user being filmed by the camera to thereby produce image data;
    generating descriptive data of a position or movement of the gesticulating arm by a gesture recognition device, based on the image data produced by the camera;
    recognizing an operating gesture by associating the descriptive data with one of a plurality of predefined operating gestures based on a first classification;
    determining from a displacement history using the image data, the displacement history relating to a prior movement process of the gesticulating arm;
    determining, using a plausibility verification device of the user interface, at least one situation parameter that includes a current position of the gesticulating arm and describes a gesticulation context of the user;
    determining, based on how a current movement process of the gesticulating arm relates to the displacement history, the at least one situation parameter, and a second classification, whether the user is performing a possible operating gesture that the user intends to be recognized or is performing a gesture that the user does not intend to be recognized and that is to be ignored;
    outputting a control command to a receiver for a motor vehicle system depending on the operating gesture recognized based on the first classification if it is determined that the user is performing the possible operating gesture that the user intends to be recognized; and inhibiting the output of the control command if it is determined that the gesture is to be ignored, wherein the gesture recognition device and the plausibility verification device include at least one processor.

2. A method for operating a user interface in a motor vehicle, wherein the user interface comprises a camera, the method comprising:

filming a user who is gesticulating with a gesticulating arm, within an interior of the motor vehicle by the user being filmed by the camera to thereby produce image data;

generating descriptive data of a position or movement of the gesticulating arm by a gesture recognition device, based on the image data produced by the camera;

recognizing an operating gesture by associating the descriptive data with one of a plurality of predefined operating gestures based on a first classification;

determining, using a plausibility verification device of the user interface, at least one situation parameter that describes a gesticulation context of the user;

determining, using the at least one situation parameter and a second classification, whether the user is performing a possible operating gesture or only a gesture that is not defined for operation and that is to be ignored;

outputting a control command to a receiver for a motor vehicle system depending on the operating gesture recognized based on the first classification if it is determined that the user is performing a possible operating gesture; and inhibiting the output of the control command if it is determined that the gesture is to be ignored, wherein the at least one situation parameter includes at least one of:

a speed of at least one movable part or joint of the gesticulating arm, an acceleration of the at least one movable part or joint of the gesticulating arm, an indication as to whether the at least one movable part or joint of the gesticulating arm has been moved with a jerky movement, by which a change of position within a predefined time is greater than a predetermined maximum change of position, an angle of the at least one movable part or joint of the gesticulating arm relative to at least one other movable part or joint, and a location of each movable part or joint of the gesticulating arm, wherein:

if the at least one situation parameter includes the speed of the at least one movable part or joint of the gesticulating arm, it is determined that the user is performing the possible operating gesture only if each speed lies within a respective predefined range of speed values, if the at least one situation parameter includes the acceleration of the at least one movable part or joint of the gesticulating arm it is determined that the user is performing the possible operating gesture only if each acceleration lies within a respective predefined range of acceleration values, if the at least one situation parameter indicates the jerky movement, it is determined that the user is performing a gesture to be ignored, if the at least one situation parameter includes the angle of the at least one movable part or joint of the gesticulating arm relative to at least one other movable part or joint, it is determined that the user is performing the possible operating gesture only if each angle lies within a respective predefined range of angle values, and if the at least one situation parameter includes the location of each movable part or joint of the gesticulating arm, it is determined that the user is performing the possible operating gesture if each location lies within a respective predefined spatial region.

3. The method as claimed in claim 1, wherein the at least one situation parameter comprises an acceleration of at least one movable part or joint of the at least one arm, and it is determined that the user is performing a possible operating gesture only if each acceleration lies within a respective predefined range of acceleration values.

4. The method as claimed in claim 1, wherein the at least one situation parameter indicates whether at least one movable part or joint of the gesticulating arm has been moved with a jerky movement, by which a change of position within a predefined time is greater than a predetermined maximum change of position, and if the at least one situation parameter indicates the jerky movement, it is determined that the user is performing a gesture to be ignored.

5. The method as claimed in claim 1, wherein the at least one situation parameter comprises an angle of at least one movable part or joint of the gesticulating arm relative to at least one other movable part or joint, and it is determined that the user is performing a possible operating gesture only if each angle lies within a respective predefined range of angle values.

6. The method as claimed in claim 1, wherein the at least one situation parameter comprises a location of each movable part or joint of the gesticulating arm, and it is determined that the user is performing a possible operating gesture if each location lies within a respective predefined spatial region.

7. The method as claimed in claim 1, wherein the control command is output without the user first activating a dedicated gesture activation button in the motor vehicle after the motor vehicle has been started.

8. The method as claimed in claim 1, wherein the displacement history relates to a prior movement process of the gesticulating arm, and the displacement history is assembled so as to specify whether the prior movement process of the gesticulating arm was classified based on the first classification and caused an uninhibited control command to be output.

9. The method as claimed in claim 1, wherein the at least one situation parameter is determined from the image data.

10. The method as claimed in claim 1, wherein to suppress a defined control command, an associated operating gesture that will trigger the defined control command is excluded from the first classification.

11. The method as claimed in claim 1, wherein the camera is at least one of: a stereo camera and a Photonic Mixing Device camera.

12. The method as claimed in claim 1, wherein a body model of at least one part of the user is merged into image data of an optical sensor of the camera and the at least one situation parameter is determined using the body model.

13. The method as claimed in claim 1, wherein in addition to the gesticulating arm, image data is captured relating to a body model and a current body position of the user, the current body position of the user is used to identify control commands that are currently appropriate, and all control commands other than the control commands that are currently appropriate are inhibited.

14. The method as claimed in 1, wherein in addition to the gesticulating arm, image data is captured relating to a body model and a body position of the user, the at least one situation parameter relates to at least one of a position of the gesticulating arm, a speed of movement of the gesticulating arm, an acceleration of the gesticulating arm and an angle present in the gesticulating arm, and the body model is used to define a range for each operating parameter such that which positions or movements of the gesticulating arm will produce the control command is varied based on the current body position of the user.

15. A method for operating a user interface in a motor vehicle, wherein the user interface comprises a camera, the method comprising:

filming a user who is gesticulating with a gesticulating arm, within an interior of the motor vehicle by the user being filmed by the camera to thereby produce image data;

generating descriptive data of a position or movement of the gesticulating arm by a gesture recognition device, based on the image data produced by the camera;

recognizing an operating gesture by associating the descriptive data with one of a plurality of predefined operating gestures based on a first classification;

determining, using a plausibility verification device of the user interface, at least one situation parameter that includes a current position of the gesticulating arm and describes a gesticulation context of the user;

determining, using the at least one situation parameter, and a second classification, whether the user is performing a possible operating gesture that the user intends to be recognized or is performing a gesture that the user does not intend to be recognized and that is to be ignored;

outputting a control command to a receiver for a motor vehicle system depending on the operating gesture recognized based on the first classification if it is determined that the user is performing the possible operating gesture that the user intends to be recognized; and inhibiting the output of the control command if it is determined that the gesture is to be ignored, wherein the gesture recognition device and the plausibility verification device include at least one processor, a body model of at least one part of the user is merged into image data of an optical sensor of the camera and the at least one situation parameter is determined using the body model, and determining the gesticulation context associates a probability value relating to an operating intention of the user with a statistical model with a respective current parameter value of the parameter and an overall probability value for the operating intention is determined based on the probability values of all checked parameters, and the control command is inhibited if the overall probability value is smaller than a predetermined minimum value.

16. The method as claimed in claim 1, wherein a plurality of situation parameters are determined, each relating to a different aspect of user behavior, and a statistical model is used to consider all of the situation parameters, to determine an overall behavior model for the user and to only output the control command if the behavior model corresponds with the recognized operating gestures.

17. A method for operating a user interface in a motor vehicle, wherein the user interface comprises a camera, the method comprising:

filming a user who is gesticulating with a gesticulating arm, within an interior of the motor vehicle by the user being filmed by the camera to thereby produce image data;

generating descriptive data of a position or movement of the gesticulating arm by a gesture recognition device, based on the image data produced by the camera;

recognizing an operating gesture by associating the descriptive data with one of a plurality of predefined operating gestures based on a first classification;

determining, using a plausibility verification device of the user interface, at least one situation parameter that includes a current position of the gesticulating arm and describes a gesticulation context of the user;

determining, using the at least one situation parameter, and a second classification, whether the user is performing a possible operating gesture that the user intends to be recognized or is performing a gesture that the user does not intend to be recognized and that is to be ignored;

outputting a control command to a receiver for a motor vehicle system depending on the operating gesture recognized based on the first classification if it is determined that the user is performing the possible operating gesture that the user intends to be recognized; and inhibiting the output of the control command if it is determined that the gesture is to be ignored, wherein the gesture recognition device and the plausibility verification device include at least one processor, the at least one situation parameter further determines whether the user is currently involved in a conversation, and if the user is currently involved in a conversation, it is determined that the user is performing a gesture to be ignored.

18. A user interface operating at least one device in a motor vehicle, comprising:

a camera to film a user who is gesticulating with a gesticulating arm in the interior of the motor vehicle, and to produce image data;

a gesture recognition device coupled to the camera, to determine a position or a series of motions of the at least one gesticulating arm based on the image data of the camera, to recognize an operating gesture by associating the image data with one of a plurality of predefined operating gestures, and to output a control command to the at least one device depending on the operating gesture recognized; and a plausibility verification device to determine at least one situation parameter that includes a current position of the gesticulating arm and describes a gesticulation context of the user, to determine, using the at least one situation parameter and a first classification, whether the user is performing a possible operating gesture that the user intends to be recognized or is performing a gesture that the user does not intend to be recognized and that is to be ignored, and to inhibit the output of the control command if it is determined that the gesture is to be ignored,
wherein
the gesture recognition device and the plausibility verification device include at least one processor,
in addition to the gesticulating arm, image data is captured relating to a body model and a body position of the user,
the at least one situation parameter relates to at least one of a position of the gesticulating arm, a speed of movement of the gesticulating arm, an acceleration of the gesticulating arm and an angle present in the gesticulating arm, and
the body model is used to define a range for each operating parameter such that which positions or movements of the gesticulating arm will produce the control command is varied based on the current body position of the user.

19. A motor vehicle with a user interface as claimed in claim 18.

* * * * *

UNITED STATES PATENT AND TRADEMARK OFFICE
CERTIFICATE OF CORRECTION

PATENT NO. : 9,738,158 B2  
APPLICATION NO. : 14/901436  
DATED : August 22, 2017  
INVENTOR(S) : Michael Schlittenbauer et al.

Page 1 of 1

It is certified that error appears in the above-identified patent and that said Letters Patent is hereby corrected as shown below:

In the Claims

Column 12, Line 64:
In Claim 13, after "in" insert -- claim --.

Column 13, Line 5:
In Claim 14, after "in" insert -- claim --.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*